United States Patent [19]
Barry et al.

[11] Patent Number: 5,273,801
[45] Date of Patent: Dec. 28, 1993

[54] THERMOFORMED VACUUM INSULATION CONTAINER

[75] Inventors: Patrick J. Barry, Benton Township, Berrien County; David B. Kirby, St. Joseph Township, Berrien County, both of Mich.

[73] Assignee: Whirlpool Corporation, Benton Harbor, Mich.

[21] Appl. No.: 815,709

[22] Filed: Dec. 31, 1991

[51] Int. Cl.$^5$ .............................. B32B 1/04
[52] U.S. Cl. ........................ 428/69; 428/71; 428/76; 428/315.9; 428/316.6; 206/484.2; 206/524.8
[58] Field of Search ............ 428/315.9, 316.6, 69, 428/71, 76; 206/484.2, 524.8

[56] References Cited

U.S. PATENT DOCUMENTS

| | | |
|---|---|---|
| 2,768,046 | 10/1956 | Evans . |
| 2,989,156 | 6/1961 | Brooks et al. . |
| 3,010,262 | 11/1961 | Rumsey, Jr. . |
| 3,179,549 | 4/1965 | Strong et al. . |
| 3,467,244 | 9/1969 | Mahaffy et al. . |
| 3,921,844 | 11/1975 | Walles . |
| 4,444,821 | 4/1984 | Young ............................ 428/69 |
| 4,486,482 | 12/1984 | Kobayashi et al. ................ 428/69 |
| 4,662,521 | 5/1987 | Moretti ........................... 206/484.2 |
| 4,681,788 | 7/1987 | Barito et al. ..................... 428/68 |
| 4,985,106 | 1/1991 | Nelson ............................ 156/276 |
| 4,988,406 | 1/1991 | Nelson ............................ 156/73.6 |
| 5,018,328 | 5/1991 | Cur ................................ 50/406 |
| 5,032,439 | 7/1991 | Glicksman et al. ................ 428/44 |

Primary Examiner—George F. Lesmes
Assistant Examiner—Chris Raimund
Attorney, Agent, or Firm—Hill, Steadman & Simpson

[57] ABSTRACT

A thermoformed vacuum insulation container is provided for use in a vacuum insulation panel. The container is preformed to have a receptacle area for receiving a quantity of microporous insulation material as well as a peripheral ledge area. The microporous insulating material is isolated by a porous sheet material which is either sealed to the ledge area covering the receptacle area, or completely bounds the microporous insulation material in the form of a pouch or sack. An impermeable layer is sealed to the ledge area following evacuation of the receptacle area and microporous insulation material of gases and moisture in order to complete the evacuated panel.

21 Claims, 2 Drawing Sheets

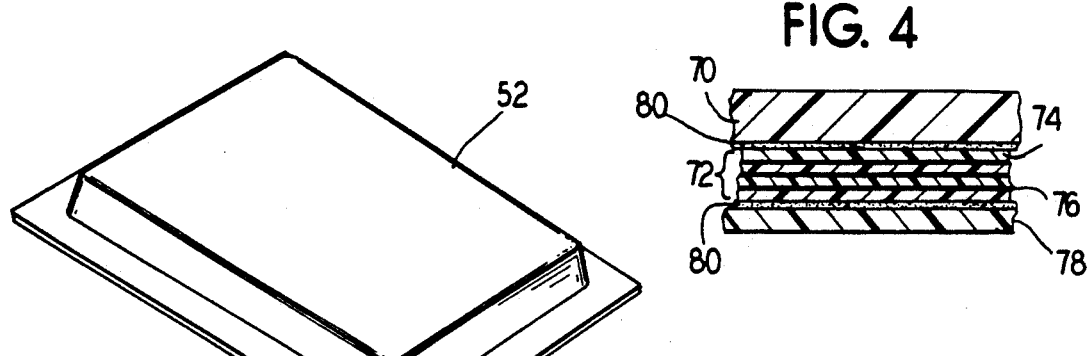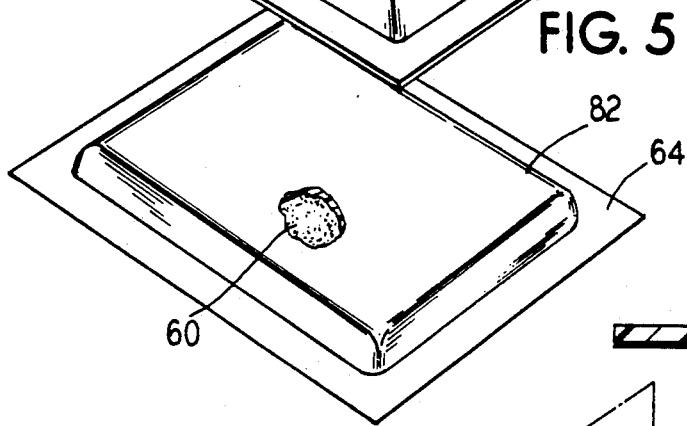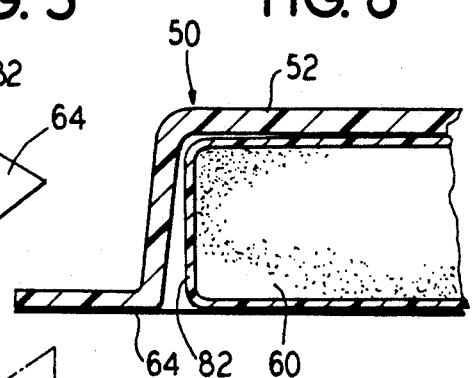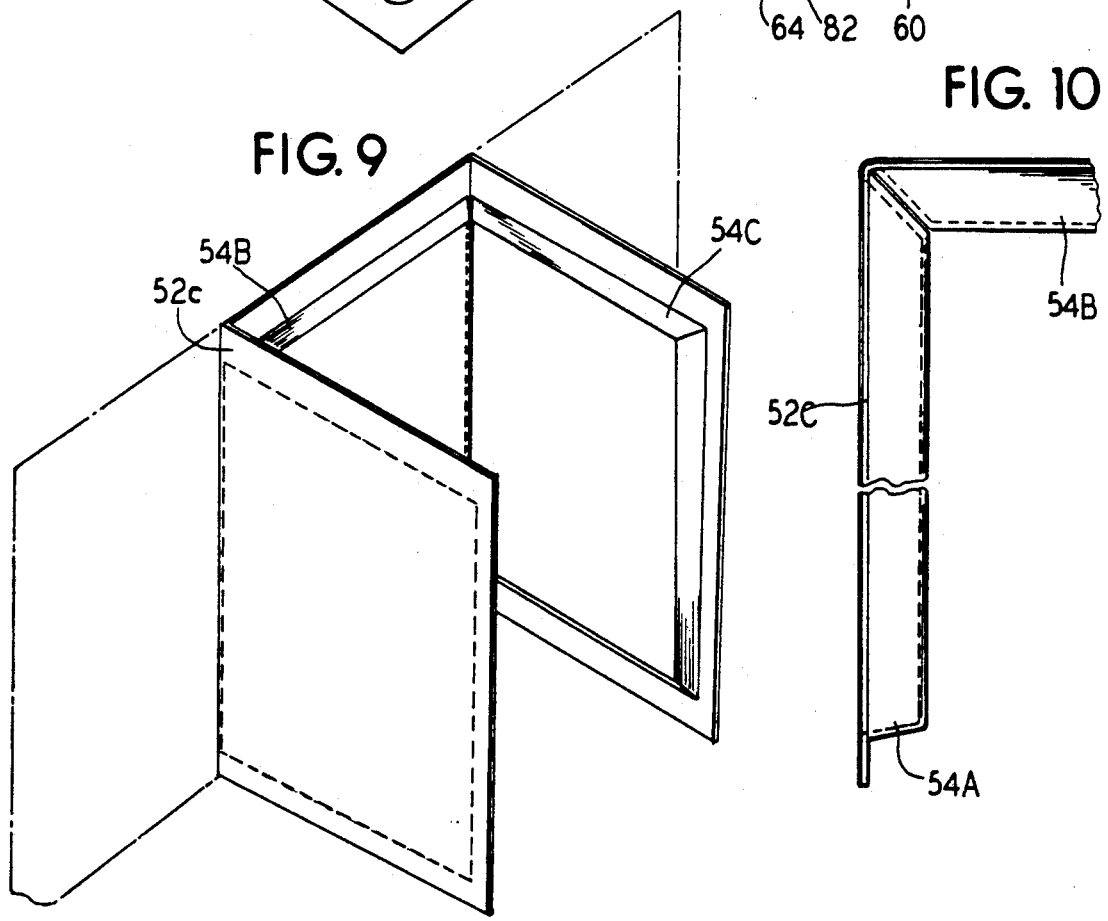

THERMOFORMED VACUUM INSULATION CONTAINER

BACKGROUND OF THE INVENTION

This invention relates to insulation devices and more particularly to a vacuum insulation container for use in a domestic appliance.

Vacuum insulation panels are known for use in domestic appliances such as refrigerator cabinets. For example, U.S. Pat. No. 4,681,788 discloses a vacuum thermal insulation panel used in combination with conventional foam or fiberglass insulation in the walls of the refrigerator. Other vacuum panel insulation devices are known, such as that disclosed in U.S. Pat. No. 5,018,328, incorporated herein by reference, but in each instance, the panels are formed from a flexible barrier film laminate.

SUMMARY OF THE INVENTION

The present invention provides an improved vacuum insulation panel and method for constructing such a panel. Broadly, a container member is formed into a tray-like shape, such as by blow molding, vacuum forming, injection molding, or stamping or similar methods to provide a semi-rigid receptacle area for microporous filler material. The filler material is then deposited into the receptacle area, either in a loose form, or in a prefilled package. In either event, a covering for the microporous material is provided, either in the form of a sheet to overlie the receptacle in the container or as the walls of the pre-packaged filler material. The covering must be made of a material which is porous to gases and moisture, yet which prevents passage of the microporous insulating material. This cover, if a separate sheet, must be sealed to the tray shaped container.

Once the microporous material has been covered by the porous material the filled tray will be placed in a chamber which can be evacuated and preferably heated such as a vacuum oven. The temperature is elevated to a specific desired temperature and the pressure within the oven is lowered to a desired vacuum level all for a predetermined amount of time in order to evacuate gases and moisture from the interior of the receptacle and from the microporous insulating material.

Preferably, but not necessarily, the non-porous cover sheet is sealed to at least a portion of the periphery of the tray. After the predetermined time in which the pressure has been lowered and the temperature elevated, the remaining portion of the periphery will be sealed so that the microporous insulating material within the receptacle area will be completely isolated from the exterior of the container. The pressure within the vacuum oven will then be raised to ambient atmospheric pressure and the panel assembly will thus be completed.

The panels can be formed with a single receptacle or may be formed with multiple receptacles if desired. In the case of multiple receptacles, the sheet itself may be foldable so that the sheet, if used within a cabinet, such as a refrigerator cabinet, may be used to insulate the plurality of the walls of the cabinet.

Enhancements to this basic arrangement may also be provided including using multiple panels carried nested within each other to enhance the vacuum integrity of the interior panel, or the use of other materials in addition to microporous insulating material, such as getters, heat reflective materials and the like. Various options along these lines are described in allowed U.S. Pat. No. 5,091,233 entitled "GETTER STRUCTURE FOR VACUUM INSULATION PANELS" incorporated herein by reference.

BRIEF DESCRIPTION OF THE DRAWINGS

FIG. 4 is an enlarged partial sectional view of the container wall showing the various material components of the wall.

FIG. 5 is an exploded perspective view of an unassembled panel with the microporous insulating material in a preformed porous pouch.

FIG. 6 is a partial sectional view of the panel of FIG. 5 in an assembled form.

FIG. 9 is a perspective view of an embodiment of the invention showing a foldable panel.

FIG. 10 is a partial end elevational view of the corner of a folded panel.

DESCRIPTION OF THE PREFERRED EMBODIMENTS

Figure 1:
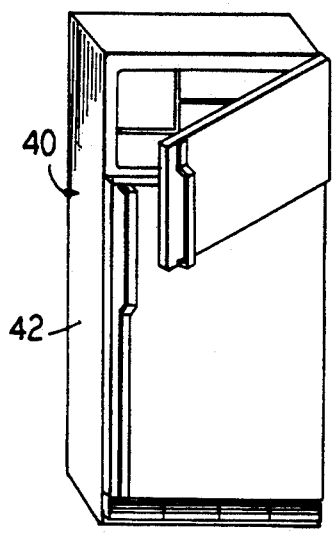
FIG. 1 is a perspective view of a refrigerator cabinet in which the thermoformed vacuum insulation container of the present invention would be useful.

In FIG. 1 there is illustrated a refrigerator 40 which has a cabinet 42 in which the use of a thermoformed vacuum insulation panel formed in accordance with the present invention would be advantageous. The container of the present invention could form a part of the structure of the cabinet, as described in allowed U.S. Pat. No. 5,91,233, entitled "VACUUM INSULATION SYSTEM FOR INSULATING REFRIGERATION CABINETS", incorporated herein by reference, not only providing thermal insulation for the cabinet, but providing some structural integrity as well.

Figure 2:
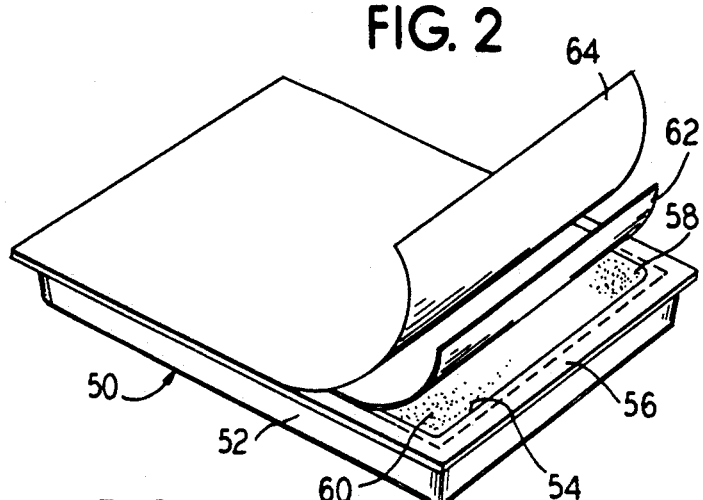
FIG. 2 is a perspective view of the panel schematically illustrating the various layers of materials within the panel.
Figure 3:
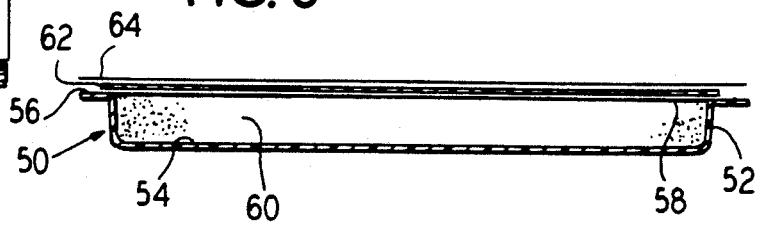
FIG. 3 is a side sectional view of the panel of FIG. 2, again showing the various layers in an exploded fashion.

A vacuum insulation panel according to the present invention is shown in a specific embodiment in FIGS. 2 and 3 wherein it is seen that the panel 50 is comprised of a first container member 52 which is to be made of a material substantially impervious to gases and moisture and which has low thermal conductivity. The container member 52 is preferably pre-formed such that it will have a central receptacle area 54 and a peripheral ledge area 56 surrounding the central receptacle area. Thus, the container member 52 will assume a tray-like configuration. The container member 52 will have an open top area 58 for receiving a volume of microporous insulating material 60.

A layer or covering of porous material 62 is provided as a boundary between atmosphere and the volume of microporous insulating material 60 which is carried in the central receptacle area 54. The layer of porous material 62 permits passage of gases and moisture but prevents passage of the microporous insulating material 60.

In the embodiment illustrated in FIGS. 2 and 3, the layer of porous material 62 comprises a sheet like member which is completely sealed around its edges to the peripheral ledge area 56 of the container member 52.

Finally, an impermeable layer 64 is sealed along the entire peripheral ledge area 56 of the container member 52 to close the open top area 58 after the central receptacle area 54 and microporous insulating material 60 have been evacuated of gases and moisture. Thus, the microporous insulating material 60 will be completely sealed in the panel 50. The impermeable layer 64 should be formed of a material to prevent entry of gases and moisture into the receptacle area 54 during the useful life of the panel which is to be measured in years, preferably on the order of 20 years.

The container member 52 preferably formed of a multi-ply material in that needs to provide a number of different functions, such as: toughness; resistance to foam chemicals, but adherent for structure; thermoformability; barrier to gases such as $O_2$, $N_2$, $CO_2$, A; sealability; ability for scrap recycle; low cost; and optionally, a barrier to moisture. A number of different materials can be used to achieve the desired functions, but a specific example of materials which Applicants have found to be acceptable is illustrated in FIG. 4.

First, there is a layer 70 which may be a 18 mil layer of high density polyethylene (HDPE). This material among other things, acts as a scrap receptor and a moisture barrier. This surface resists foam attack, but it must be corona treated to allow foam adhesion. Next, there is a seven layer sandwich 72 of alternating 1.0 mil EVOH 74 and 0.4 mil adhesive 76. The adhesive allows extensibility and acts as a compatibilizer for regrind into the HDPE. At the bottom there is a 2.5 mil layer of PE-AA heat seal 78 which is compatible with the HDPE, adhesive to other LDPE sealants and metal. Finally, there are two tie adhesive layers 80, each of about 0.5 mil thickness, also LDPE derivatives to enhance scrap recyclability.

This particular embodiment would allow the container member 52 to be made at very low cost. A female thermoforming mold would be used to form the container to prevent adhesion to the mold by the adhesive layer 78. The use of this material would permit packaging of the evacuated microporous insulating material 60 so that it would not surpass a tolerance level of up to about 20 millimeters Hg pressure over a lifetime of approximately 20 years. This package material could be sealed to itself, metal, or a foil or film laminate as the impermeable layer 64 with a compatible heat seal material. The particular metal or foil or film laminate that can be used for the substantially impermeable layer 64 is described in U.S. Pat. No. 5,018,328.

FIGS. 5 and 6 show an alternate arrangement for the forming of the panel 50. In the embodiment shown therein, the microporous insulating material 60 is prepackaged within the layer of porous material 62 which has been sealed to itself to form a completely enclosed bag or pouch 82. This pouch 82 can then be placed into the central receptacle area 54 of the container member 52, or the container member placed over the pouch so that the impermeable layer 64 can be sealed to the peripheral ledge area 56 of the container member 52.

Figure 7:
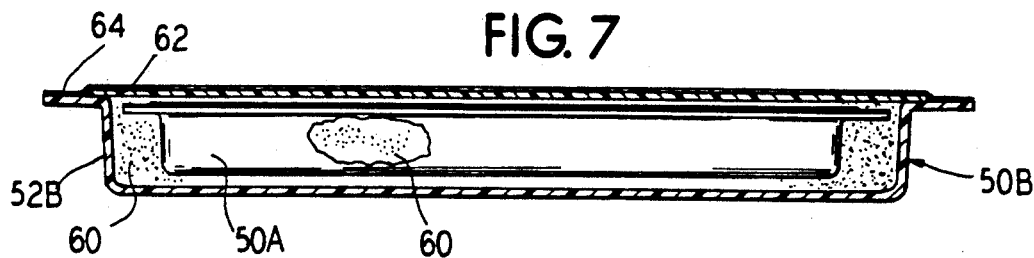
FIG. 7 is a side sectional view of an embodiment of the invention illustrating two nested panels.

Another alternate assembly arrangement is illustrated in FIG. 7 wherein it is seen that a first panel 50A which already has been filled and sealed is positioned within the microporous insulating material 60 in a second, larger container member 52B prior to the impermeable layer 64 being sealed thereon forming a second, outer panel 50B. Thus, the vacuum contained within the inner panel 50A would be protected by the outer panel 50B. That is, the pressure difference across the walls of the outer panel 50B would be approximately atmospheric pressure due to the high vacuum level within the panel. However, the pressure difference across walls of the interior panel 50A would be potentially zero and, even over the life of the panel would remain quite small. Thus, the vacuum integrity of the interior panel would remain quite high since the integrity is highly dependent on the pressure drop across the walls of the panel.

Various additives can be used with the microporous insulating material, including gettering materials to absorb moisture and various gases which permeate into the panels during the life of the panel as more fully described in U.S. Pat. No. 5,091,233. By using the two panels as shown in FIG. 7, different gettering materials can be used within the different panels 50A and 50B. For example, a relatively cheap moisture absorbing gettering material used within panel 50B and more expensive gas gettering material in a protected panel 50A, as described in U.S. Pat. No. 5,091,233.

Figure 8:
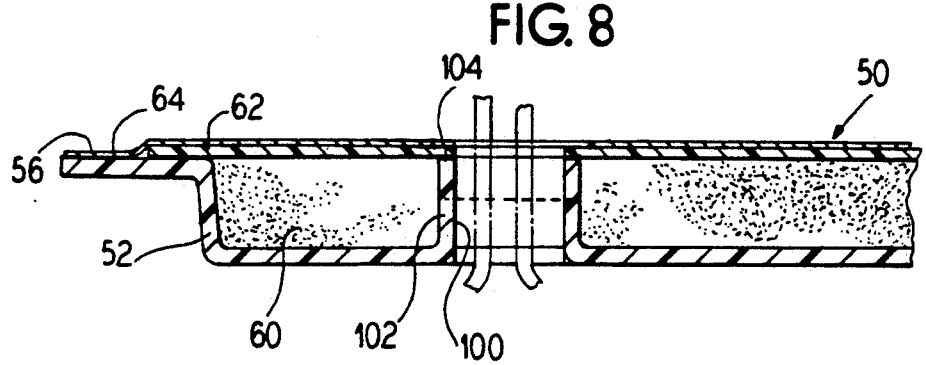
FIG. 8 is a partial side sectional view of an embodiment of the invention showing a passage formed through the panel.

FIG. 8 illustrates means for permitting wires or other members to pass through a panel without harming the vacuum integrity of the panel. A passageway 100 is formed by means of a boss 102 extending from the container member 52 within the central receptacle area 54. The passageway 100 extends entirely through the length of the boss 102 and, the wall thickness of the boss is sufficient so that a large enough surface area at a circumferential end 104 of the boss will be available to sealingly receive the impermeable layer 64 so that, again, the integrity of the vacuum within the panel 50 will be maintained. If necessary, a flange may be provided around the circumferential end of the boss to provide a larger sealing area.

FIGS. 9 and 10 illustrate a version of the container member which has a plurality of separate receptacle areas 54A, 54B and 54C. The container member 52C is flexible enough so as to be foldable between adjacent receptacle areas so that the panel, when assembled, can be folded to conform to two or more adjacent walls in a cabinet which is to be insulated. Thus, as seen in FIG. 10, insulating gaps between adjacent panels can be avoided.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A vacuum insulation panel containing a volume of microporous insulating material and having a useful life measured in years, comprising:

a semi-rigid thermoformed container made of a material impervious to gases and moisture and having a central receptacle area with an open top for receiving said volume of said microporous insulating material and being bounded by a peripheral ledge area;

a porous layer providing a boundary between ambient atmosphere and said volume of microporous insulating material in said receptacle, said porous layer permitting passage of gases and moisture, but preventing passage of said microporous insulating material; and an impermeable layer sealingly received along the entire peripheral ledge area to close said top after said receptacle area and volume of microporous insulating material has been evacuated of gases and moisture, to prevent entry of gases and moisture into said receptacle during the useful life of said panel;

said container and impermeable layer both being formed of a material such that said panel, when sealed closed, is able to maintain an evacuation pressure level of approximately 20 mm Hg for several years.

2. A vacuum insulation panel containing a volume of microporous insulating material and having a useful life measured in years, comprising:

a formed container made of a material impervious to gases and moisture and having a central receptacle area with an open top for receiving said volume of said microporous insulating material and being bounded by a peripheral ledge area;

a porous layer sealed to said ledge area providing a boundary between ambient atmosphere and said volume of microporous insulating material in said receptacle, said porous layer permitting passage of gases and moisture, but preventing passage of said microporous insulating material; and an impermeable layer sealingly received along the entire peripheral ledge area to close said top after said receptacle area and volume of microporous insulating material has been evacuated of gases and moisture, to prevent entry of gases and moisture into said receptacle during the useful life of said panel.

3. A vacuum insulation panel according to claim 1, wherein said porous layer completely surrounds said microporous insulating material.

4. A vacuum insulation panel according to claim 3, wherein said porous layer forms a sealed bag.

5. A vacuum insulation panel according to claim 1, wherein said container is substantially rectangular in shape.

6. A vacuum insulation container according to claim 1, further comprising a sealed container made of material impervious to gases and moisture and containing a charge of microporous insulating material received within said central receptacle area along with said microporous insulating material.

7. A vacuum insulation container according to claim 6, wherein gettering materials are used within said containers, with different gettering materials used in the different chambers.

8. A vacuum insulation container according to claim 2, further comprising a sealed container made of material impervious to gases and moisture and containing a charge of microporous insulating material received within said central receptacle area along with said microporous insulating material.

9. A vacuum insulation container according to claim 8, wherein gettering materials are used within said containers, with different gettering materials used in the different chambers.

10. A vacuum insulation panel containing a volume of microporous insulating material and having a useful life measured in years, comprising:

a formed containing made of a material impervious to gases and moisture and having a central receptacle area with an open top for receiving said volume of said microporous insulating material and being bounded by a peripheral ledge area;

a porous layer providing a boundary between ambient atmosphere and said volume of microporous insulating material in said receptacle, said porous layer permitting passage of gases and moisture, but preventing passage of said microporous insulating material;

an impermeable layer sealingly received along the entire peripheral ledge area to close said top after said receptacle area and volume of microporous insulating material has been evacuated of gases and moisture, to prevent entry of gases and moisture into said receptacle during the useful life of said panel; and at least one passage formed through said receptacle area, said passage formed by a hollow boss with a passage therethrough and having a flat surface area at a top end, substantially coplanar with said ledge area, for sealing engagement with said impermeable layer.

11. A vacuum insulation container according to claim 10, further comprising a sealed container made of material impervious to gases and moisture and containing a charge of microporous insulating material received within said central receptacle area along with said microporous insulating material.

12. A vacuum insulation container according to claim 11, wherein gettering materials are used within said containers, with different gettering materials used in the different chambers.

13. A vacuum insulation panel containing a volume of microporous insulating material and having a useful life measured in years, comprising:

a formed container of a material impervious to gases and moisture and having a central receptacle area with an open top for receiving said volume of said microporous insulating material and being bounded by a peripheral ledge area;

a plurality of receptacle areas formed in said container to provide a plurality of discrete insulation filled volumes;

a porous layer providing a boundary between ambient atmosphere and said volume of microporous insulating material in said receptacle, said porous layer permitting passage of gases and moisture, but preventing passage of said microporous insulating material; and an impermeable layer sealingly received along the entire peripheral ledge area to close said top after said receptacle area and volume of microporous insulating material has been evacuated of gases and moisture, to prevent entry of gases and moisture into said receptacle during the useful life of said panel;

said container being made of a material which at room temperature can be folded at least 90° along a line between adjacent receptacle areas such that said panel can be folded to form a multi-sided panel.

14. A vacuum insulation container according to claim 13, further comprising a sealed container made of material impervious to gases and moisture and containing a charge of microporous insulating material received within said central receptacle area along with said microporous insulating material.

15. A vacuum insulation container according to claim 14, wherein gettering materials are used within said containers, with different gettering materials used in the different chambers.

16. A vacuum insulation panel containing a volume of microporous insulating material and having a useful life measured in years, comprising:
    a formed container made of a material impervious to gases and moisture and having a central receptacle area with an open top for receiving said volume of said microporous insulating material and being bounded by a peripheral ledge area;
    a porous layer providing a boundary between ambient atmosphere and said volume of microporous insulating material in said receptacle, said porous layer permitting passage of gases and moisture, but preventing passage of said microporous insulating material; and
    an impermeable layer sealingly received along the entire peripheral ledge area to close said top after said receptacle area and volume of microporous insulating material has been evacuated of gases and moisture, to prevent entry of gases and moisture into said receptacle during the useful life of said panel;
    said container and impermeable layer both being formed of a multi-ply laminate material which is resistant to foam chemicals, yet allows foam adhesion.

17. A vacuum insulation container according to claim 16, further comprising a sealed container made of material impervious to gases and moisture and containing a charge of microporous insulating material received within said central receptacle area along with said microporous insulating material.

18. A vacuum insulation container according to claim 17, wherein gettering materials are used within said containers, with different gettering materials used in the different chambers.

19. A vacuum insulation panel containing a volume of microporous insulating material and having a useful life measured in years, comprising:
    a semi-rigid thermoformed container made of a material impervious to gases and moisture and having a central receptacle area with an open top for receiving said volume of said microporous insulating material and being bounded by a peripheral ledge area;
    an impermeable layer sealingly received along the entire peripheral ledge area to close said top after said receptacle area and volume of microporous insulating material has been evacuated of gases and moisture, to prevent entry of gases and moisture into said receptacle during the useful life of said panel;
    said container and impermeable layer both being formed of a multi-ply laminate material which is resistant to foam chemicals, yet allows foam adhesion such that said panel, when sealed closed, is able to maintain an evacuation pressure level of approximately 20 mm Hg for several years.

20. A vacuum insulation container according to claim 19, further comprising a sealed container made of material impervious to gases and moisture and containing a charge of microporous insulating material received within said central receptacle area along with said microporous insulating material.

21. A vacuum insulation container according to claim 20, wherein gettering materials are used within said containers, with different gettering materials used in the different chambers.

* * * * *